United States Patent [19]

Hartman

[11] Patent Number: 5,025,977

[45] Date of Patent: Jun. 25, 1991

[54] BICYCLE DROP-OUT AND METHOD OF ATTACHMENT

[75] Inventor: Joel R. Hartman, Kennewick, Wash.

[73] Assignee: Sandvik Special Metals Corporation, Kennewick, Wash.

[21] Appl. No.: 487,925

[22] Filed: Mar. 5, 1990

[51] Int. Cl.⁵ .............................................. B23K 31/02
[52] U.S. Cl. ................................ 228/171; 228/173.6; 280/279
[58] Field of Search ..................... 228/170, 171, 173.5, 228/173.6; 280/279, 288

[56] References Cited

U.S. PATENT DOCUMENTS

| | | | |
|---|---|---|---|
| 534,680 | 2/1895 | Bolte | 280/288 |
| 2,149,640 | 3/1939 | Tegarty | 228/173.6 |
| 4,662,645 | 5/1987 | McMurtrey | 280/279 |
| 4,813,591 | 3/1989 | Mueller et al. | 228/173.4 |

Primary Examiner—Kenneth J. Ramsey
Attorney, Agent, or Firm—Burns, Doane, Swecker & Mathis

[57] ABSTRACT

A metal drop-out is attached to a receiving tube of a bicycle frame. The drop-out includes a slotted axle-retaining section and a mounting section which is of one-piece integral construction with the axle-retaining section. The mounting section is bent relative to the axle-retaining section along a transverse band region by an angle by about 10 to 90 degrees. An end edge of the mounting section is machined to a generally cylindrical configuration defining a first longitudinal axis. The machined end edge of the mounting section is inserted into an end of a receiving tube and is welded thereto.

25 Claims, 4 Drawing Sheets

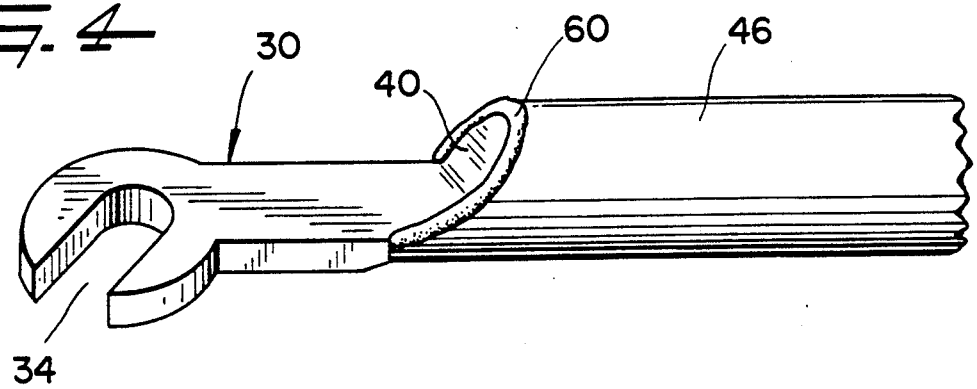
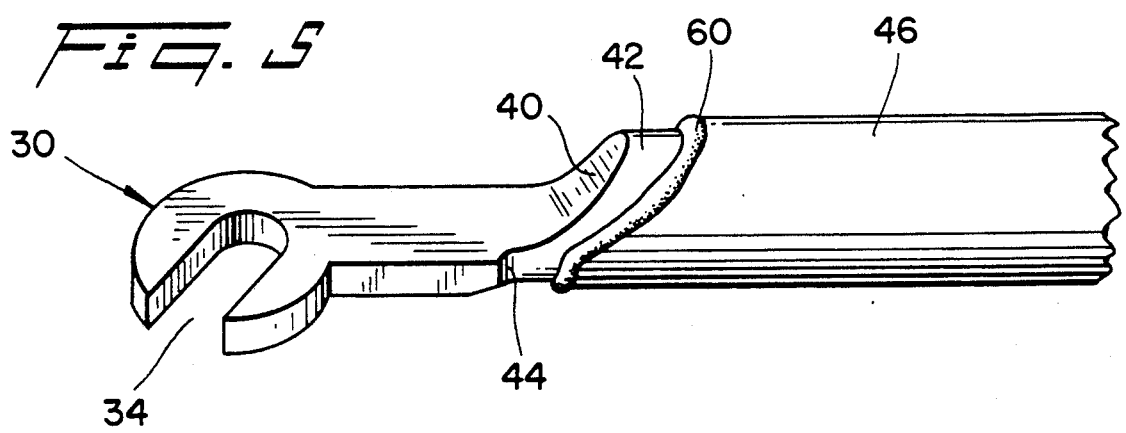

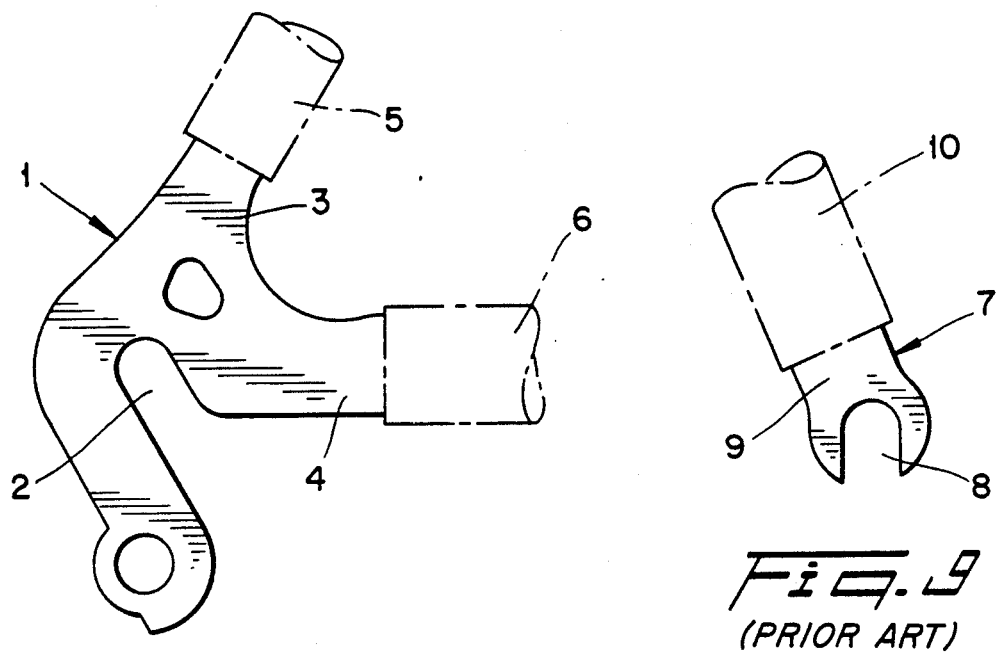
Fig.8 (PRIOR ART)
Fig.9 (PRIOR ART)
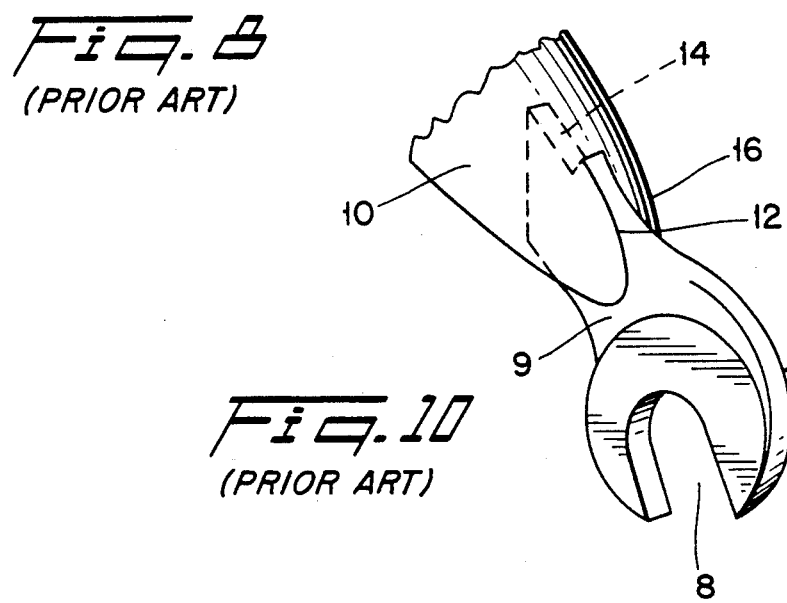
Fig.10 (PRIOR ART)
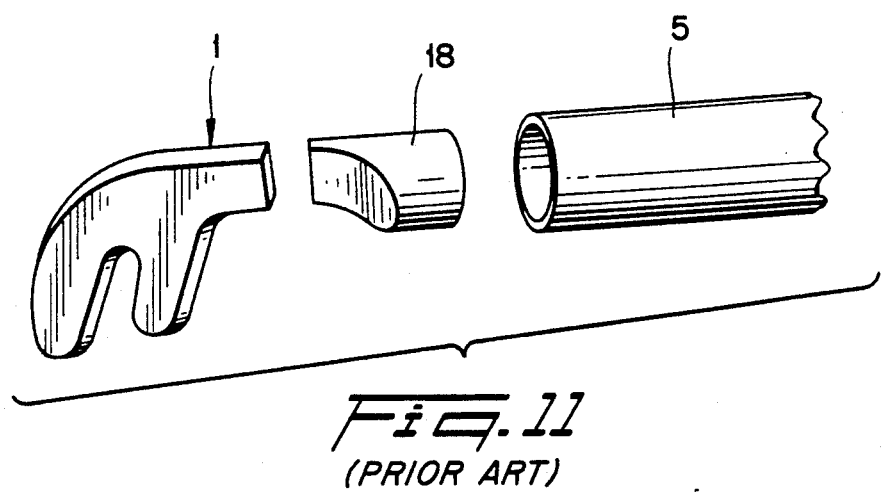
Fig.11 (PRIOR ART)

BICYCLE DROP-OUT AND METHOD OF ATTACHMENT

BACKGROUND OF THE INVENTION

The present invention relates to drop-outs for attaching bicycle axles to a bicycle frame, and to the manner of attachment of the drop-outs within receiving tubes of the frame.

The front and rear axles of a typical bicycle are attached to the front fork and frame, respectively, of the bicycle. In particular, the axles are retained in slotted elements called "drop-outs" which are welded to receiving tube portions of the front fork and frame, respectively. Depicted in FIG. 8 is a rear axle drop-out 1 which includes a slot 2 for receiving a bicycle rear axle. The drop-out 1 also includes a pair of legs 3, 4 secured in receiving tubes 5, 6 formed as part of a bicycle frame. In FIG. 9 there is depicted a front axle drop-out 7 which includes a slot 8 for receiving a bicycle front axle, and a leg 9 securable in a receiving tube 10 formed as part of a front fork of the bicycle.

Different techniques have been heretofore practiced for securing the legs of the drop-outs to their respective receiving tubes. For example, in a so-called slotted tube method depicted in FIG. 10 the receiving tube 10 is provided with a central slot 12 which receives a rear end 14 of the leg 9 of the drop-out 7. The end of the receiving tube is domed inwardly against the drop-out leg to close the tube. The tube and drop-out leg are welded together. Among other disadvantages, this slotted tube technique involves the need to perform considerable preparation work on the tube end to create the drop-out receiving slot 12 and to form the dome 16. Also, it is difficult to vary the position of the drop-out relative to the end of the tube.

A variation of the slotted tube method, called the cover plate method, involves locating the drop-out leg to one side of the tube rather than being centered therein. A cover plate is positioned over the opening between the opposite side of the tube and the drop-out leg. The cover plate and drop-out leg are welded to the tube and to each other. This technique requires less preparation of the tube than the slotted tube method, but involves more fit-up and welding time due to the need to install the separate cover plate.

Yet another drop-out securing technique, called the plug method is depicted in FIG. 11. That technique involves inserting a plug 18 into the receiving tube 5 and then welding it to the tube such that the plug projects beyond the end of the tube. The drop-out is then welded to the exposed end of the plug. Shortcomings of this technique are similar to those encountered above, i.e., a substantial fit-up and welding time.

It would, therefore, be desirable to enable a drop-out to be welded to a receiving tube of a bicycle frame or front fork with minimal time and effort.

SUMMARY OF THE INVENTION

The present invention relates to a method of attaching a metal drop-out to a receiving tube of a bicycle frame The drop-out is adapted to retain an axle. The receiving tube comprises an annular hollow metal tube The method comprises the steps of providing a drop-out having a slotted axle-retaining section and a mounting section which is of one-piece integral construction with the axle retaining section. The mounting section is bent relative to the axle-retaining section along a transverse bend region by an angle from about 10 to 90 degrees. An end edge of the mounting section is machined to a generally cylindrical configuration defining a first longitudinal axis. The end edge of the mounting section is inserted into an end of a receiving tube with the first longitudinal axis aligned with a second longitudinal axis of the tube, whereafter the end edge is bonded to the tube.

The present invention also relates to a method of making a metal drop-out which is adapted to be welded to a hollow metal receiving tube of a bicycle frame for retaining an axle. That method comprises steps of providing a metal workpiece having a slotted axle-retaining section and a mounting section which is of one-piece integral construction with the axle-retaining section. The mounting section is bent relative to the axle-retaining section along a transverse bend region by an angle of from about 10 to 90 degrees. An end of the mounting section is machined to a generally cylindrical configuration defining a longitudinal axis.

The present invention further involves a bicycle frame comprising a hollow metal receiving tube and a metal drop-out welded to the tube. The drop-out comprises a slotted axle-retaining section and a mounting section which is of one-piece integral construction with the axle-retaining section. The mounting section is bent relative to the axle-retaining section along a transverse bend region by an angle from about 10 to 90 degrees. An end edge of the mounting section is machined to a generally cylindrical configuration defining a first longitudinal axis. The end edge is disposed within and bonded to an end of the hollow tube with the first longitudinal axis aligned with a second longitudinal axis of the tube.

The present invention further relates to a metal drop-out adapted to be welded to a hollow metal receiving tube of a bicycle frame for retaining an axle. The drop-out comprises a slotted axle retaining section and a mounting section which is of one-piece integral construction with the axle-retaining section. The mounting section is bent relative to the axle-retaining section along transverse bend region by an angle of from about 10 to 90 degrees. An end edge of the mounting section is machined to a generally cylindrical configuration defining a longitudinal axis.

In connection with each aspect of the invention discussed above, the bending step is performed such that the resulting angle is preferably in the range of from about 30 to 60 degrees, most preferably about 45 degrees.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 4 is a view similar to FIG. 3 after the drop-out has been inserted all the way into the receiving tube and has been welded to the tube;

FIG. 5 is a view similar to FIG. 3 after the drop-out has been inserted only partially into the receiving tube and has been welded thereto;

FIG. 8 is a side schematic elevational view of a rear axle drop-out mounted in two receiving tubes of a bicycle frame;

FIG. 9 is a side elevational view of a front axle drop-out mounted in a receiving tube;

FIG. 10 is a perspective view of a prior art front axle drop-out mounted in a receiving tube; and FIG. 11 is a side elevational view depicting a prior art technique of attaching a front axle drop-out to a receiving tube.

DETAILED DESCRIPTION OF A PREFERRED EMBODIMENT OF THE INVENTION

Figure 1:
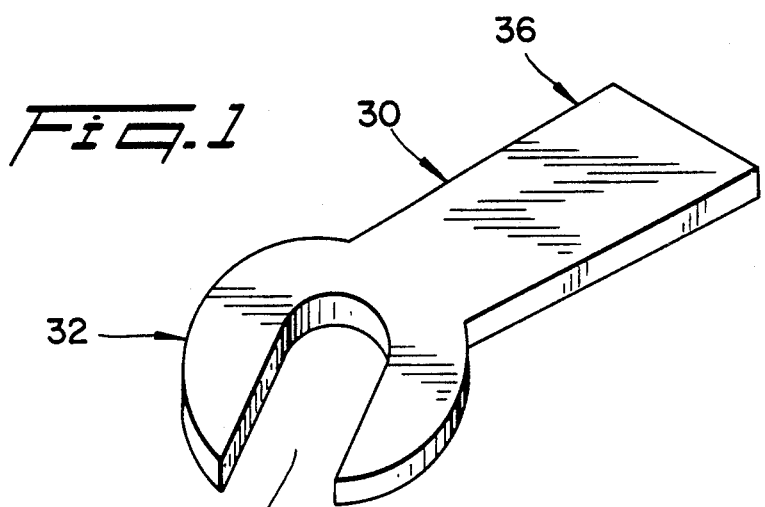
FIG. 1 is a perspective view of a drop-out according to the present invention.
Figure 2:
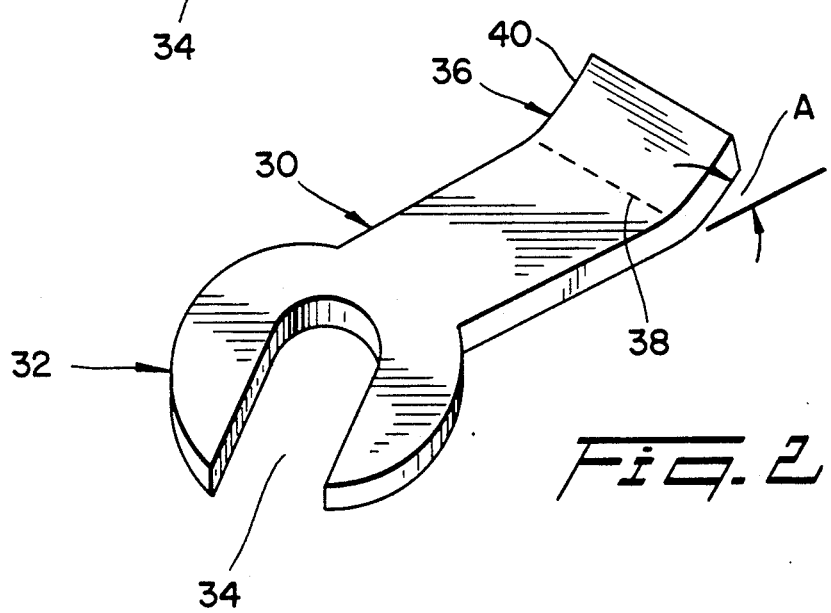
FIG. 2 is a view similar to FIG. 1 after a mounting section of the drop-out has been bent up.

In accordance with the present invention, a drop-out 30 comprises a flat plate formed for example of titanium which is initially formed with a slotted axle-retaining section 32, a slot 34 of which is adapted to receive a front axle of a bicycle (see FIG. 1). A leg portion 36 of the plate is then bent-up relative to the section 32 about a transverse bend region 38 (see FIG. 2) by an angle A in the range of from 10° to 90°, preferably from 30° to 60°, and most preferably about 45°. In the case of a drop-out for the rear axle of the bicycle (i.e., the drop-out depicted in FIG. 8), both leg portions would be bent by angle A. The bending can be performed such as to provide a radiused transition between the bent portion 40 and the slotted section 32.

The bent portion 40 thus defines a mounting section which is of one-piece integral construction with the slotted section 32. The mounting section 40 is then machined to form an end edge 42 in the form of a cylindrical surface which defines a longitudinal axis L (see FIG. 3). The length L of the cylindrical surface depends upon the thickness of the plate and the size of the angle A, i.e., the smaller the angle, the longer the length of the cylindrical surface. Thus, a 90° angle A would result in a cylindrical surface whose length L equals the original thickness of the leg, whereas a 10° angle A would result in a much longer length L. The radius of the edge 42 closely approximates an inner radius of the receiving tube whereby the edge is able to slidably fit within the receiving tube when slid coaxially thereinto.

Figure 3:
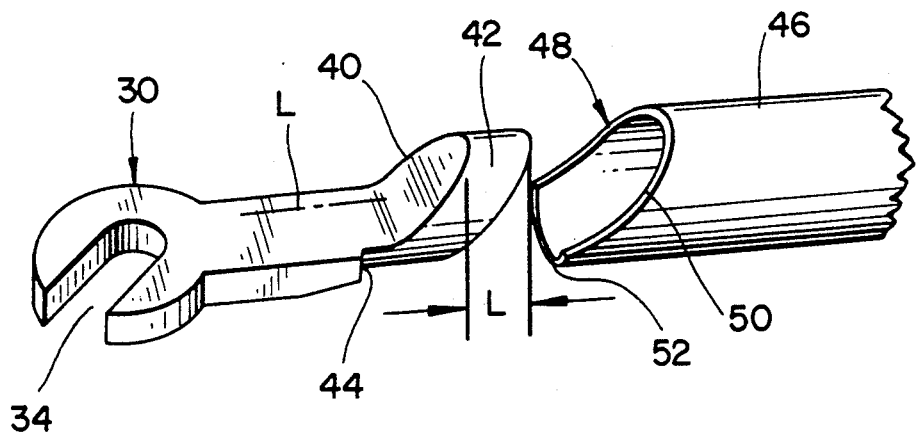
FIG. 3 is a view of the drop-out depicted in FIG. 2 prior to being inserted into the end of a receiving tube.

At the bend region 38 where the cylindrical surface joins the remaining portion of the leg, a pair of lateral stop surfaces 44 are formed at the sides of the leg (only one of which being depicted in FIG. 3)

The receiving tube 46 is formed with an end edge 48 shaped complementary to the mounting section 40. That is, a portion 50 of the end edge is beveled relative to the tube axis at an angle equal to angle A, i.e., 45° in the disclosed preferred embodiment. The remaining portion 52 of the tube end edge 48 lies in a plane oriented perpendicular to the tube axis and defines an abutment surface adapted to engage the stop surfaces 44 of the drop-out 30 in the event that the bent end 40 of the drop-out is inserted all the way into the receiving tube 46. In the event that the bent portion 40 is bent to an angle A of 90°, then the entire end edge 48 of the receiving tube 46 would lie in a plane oriented perpendicular to the tube axis.

The end edge 42 of the drop-out can be inserted to any extent within the tube 46, thereby providing a certain amount of adjustment of the slot 34 (compare FIGS. 4 and 5). Once inserted to the proper extent, the end edge 42 of the bent portion 40 is bonded to the end edge 48 of the tube preferably by a weld bead 60. Alternatively, the bonding could be achieved by brazing or the application of an adhesive As the result of such an arrangement, the fit-up and welding efforts required for attaching the drop-out to the receiving tube are greatly simplified. The preparation work necessary to prepare the receiving tube is minimized. The ability to adjust the drop-out relative to the end of the receiving tube prior to the final welding step is enhanced. Only a single weld, i.e., the weld between the bent portion of the drop-out and the end edge of the tube is needed to secure the drop-out to the receiving tube.

Figure 6:
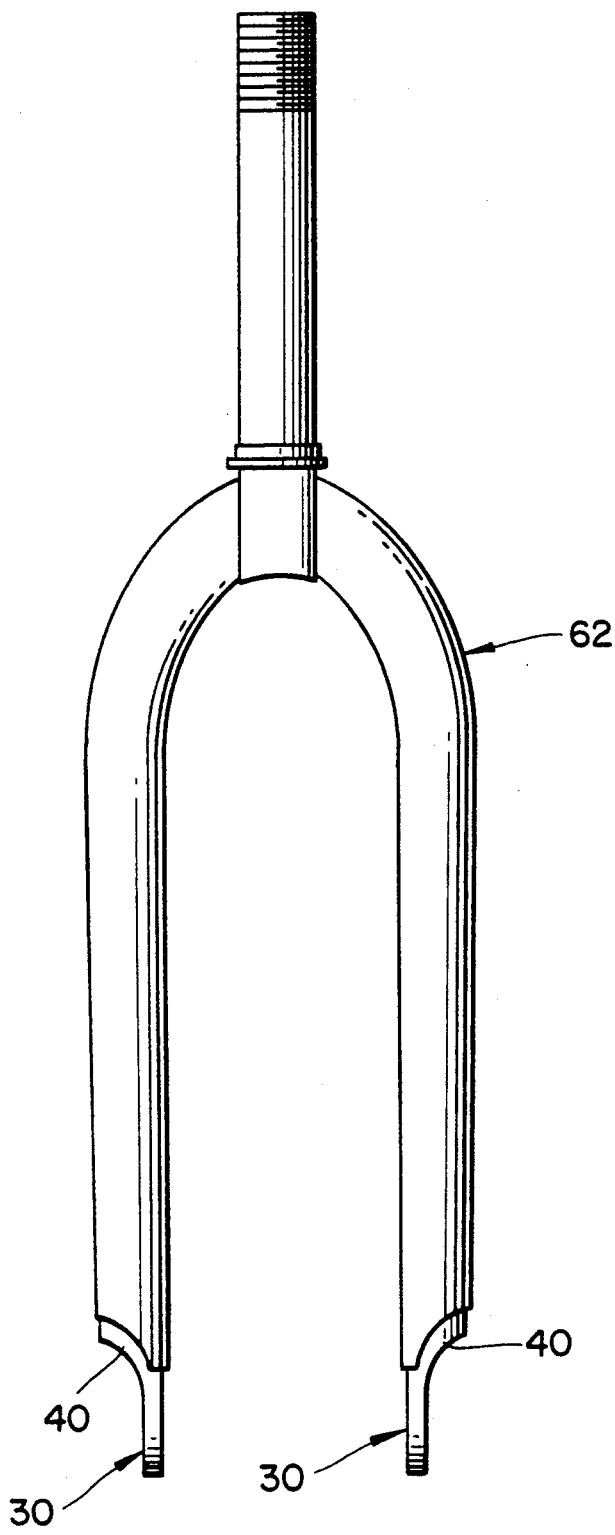
FIG. 6 is a front elevational view of a front fork of a bicycle frame after drop-outs have been mounted therein in accordance with the present invention.
Figure 7:
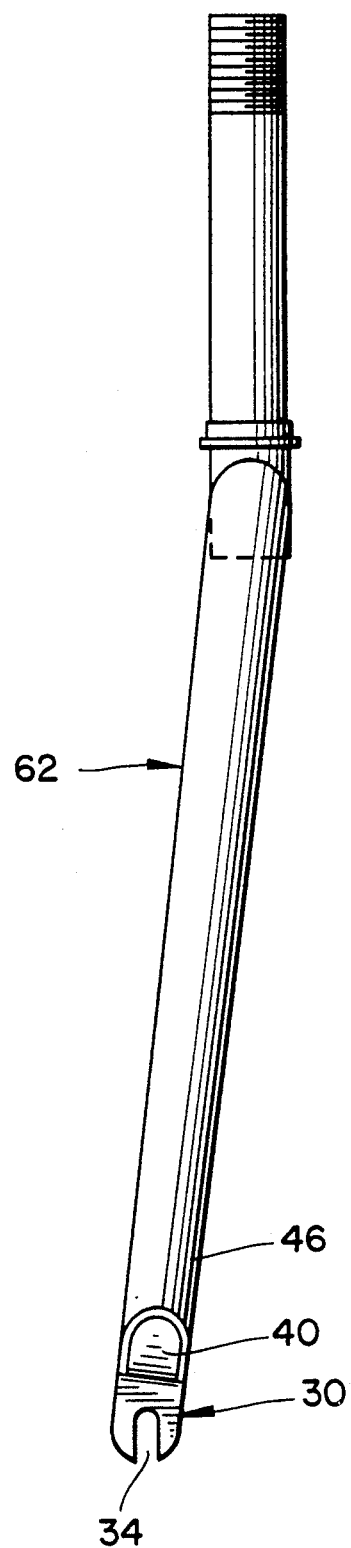
FIG. 7 is a side elevational view of the front fork depicted in FIG. 6.

FIGS. 6 and 7 depict a front fork 62 of a bicycle to which have been welded two drop-outs 30 according to the present invention. A drop-out for the rear axle of the bicycle would have its legs mounted in respective tubes of the bicycle frame using the same steps as described above.

It will be appreciated that the sequence in which the above-described steps are performed may vary within the scope of the present invention. For example, the mounting section could be machined prior to the bending step, and/or the machined end edge 42 could be inserted into the receiving tube prior to the bending step.

Although the present invention has been described in connection with a preferred embodiment of the invention, it will be appreciated by those skilled in the art that additions, substitutions, modifications and deletions not specifically described may be made without departing from the spirit and scope of the invention as defined in the appended claims.

What is claimed is:

1. A method of attaching a metal drop-out to a receiving tube of a bicycle frame, wherein said drop-out is adapted to retain an axle, said receiving tube comprising an annular hollow metal tube, said method comprising the steps of:

providing a drop-out having a slotted axle-retaining section and a mounting section which is of one-piece integral construction with said axle-retaining section, bending said mounting section relative to said axle-retaining section along a transverse bend region by an angle of from about 10° to 90°, machining an end edge of said mounting section to a generally cylindrical configuration defining a first longitudinal axis, inserting said machined end edge of said mounting section into an end of a receiving tube with said first longitudinal axis aligned with a second longitudinal axis of said tube, and bonding said end edge to said tube.

2. In a method according to claim 1, wherein said bending step is performed such that said angle is in the range of from about 30 to 60 degrees.

3. In a method according to claim 1, wherein said bending step is performed such that said angle is about 45 degrees.

4. In a method according to claim 1, wherein said bending step is performed such that said angle is less than 90 degrees, and further including the step of providing said tube with an end edge inclined by a corresponding angle relative to said second longitudinal axis.

5. In a method according to claim 1, wherein said bending step occurs prior to said machining step.

6. In a method according to claim 1, wherein said machining step occurs prior to said bending step.

7. In a method according to claim 1, wherein said bending step occurs prior to said inserting step.

8. In a method according to claim 1, wherein said machining step includes forming said mounting section with a pair of lateral stop surfaces adjacent said bend region, said shoulders adapted to limit the extent of insertion of said mounting section into said tube.

9. In a method according to claim 1, wherein said bonding step comprises welding.

10. A method of making a metal drop-out adapted to be welded to a hollow metal receiving tube of a bicycle frame for retaining an axle, said method comprising the steps of:
providing a metal workpiece having a slotted axle-retaining section and a mounting section which is of one-piece integral construction with said axle-retaining section,
bending said mounting section relative to said axle-retaining section along a transverse bend region by an angle of from about 10 to 90 degrees, and
machining an end of said mounting section to a generally cylindrical configuration defining a longitudinal axis disposed parallel to a plane of said axle-retaining section.

11. In a method according to claim 10, wherein said bending step is performed such that said angle is in the range of from about 30 to 60 degrees.

12. In a method according to claim 10, wherein said bending step is performed such that said angle is about 45 degrees.

13. In a method according to claim 10, wherein said bending step occurs prior to said machining step.

14. In a method according to claim 10, wherein said machining step occurs prior to s id bending step.

15. A method according to claim 10, wherein said machining step includes forming a pair of lateral shoulders adjacent said bend region.

16. In a bicycle frame comprising a hollow metal receiving tube and a metal drop-out welded to said tube, said drop-out comprising a slotted axle-retaining section and a mounting section which is of one-piece integral construction with said axle-retaining section, said mounting section being bent relative to said axle-retaining section along a transverse bend region by an angle of from about 10 to 90 degrees, an end edge of said mounting section being machined to a generally cylindrical configuration defining a first longitudinal axis, said end edge disposed within and bonded to an end of said hollow tube with said first longitudinal axis aligned with a second longitudinal axis of said tube.

17. In a bicycle frame according to claim 16, wherein said angle is from about 30 to 60 degrees.

18. In a bicycle frame according to claim 16, wherein said angle is about 45 degrees.

19. In a bicycle frame according to claim 16, wherein said angle is less than 90 degrees, said tube including an end edge inclined by a corresponding angle relative to said second longitudinal axis.

20. In a bicycle frame according to claim 16, wherein said drop-out includes a pair of lateral shoulders adjacent said bend region.

21. In a bicycle frame according to claim 16, wherein said end edge is welded to said end of said hollow tube.

22. A metal drop-out adapted to be welded to a hollow metal receiving tube of a bicycle frame for retaining an axle, said drop-out comprising a slotted axle-retaining section and a mounting section which is of one-piece integral construction with said axle-retaining section, said mounting section being bent relative to said axle-retaining section along a transverse bend region by an angle of from about 10 to 90 degrees, an end edge of said mounting section being machined to a generally cylindrical configuration defining a longitudinal axis.

23. In a bicycle frame according to claim 22, wherein said angle is from about 30 to 60 degrees.

24. In a bicycle frame according to claim 22, wherein said angle is about 45 degrees.

25. In a bicycle frame according to claim 22, wherein said drop-out includes a pair of lateral shoulders adjacent said bend region.

* * * * *